Patented Aug. 31, 1954

2,688,010

UNITED STATES PATENT OFFICE 2,688,010

POLYMERS OF ACRYLONITRILE AND N-SUBSTITUTED AMIDES

David W. Chaney, Nether Providence Township, Delaware County, Pa., assignor to The Chemstrand Corporation, Decatur, Ala., a corporation of Delaware No Drawing. Original application June 6, 1950, Serial No. 166,550. Divided and this application February 25, 1952, Serial No. 273,355

2 Claims. (Cl. 260—77.5)

This invention relates to a new class of polymeric materials, compositions, and shaped articles comprising the polymers, and to methods for producing them. This application is a division of my copending application, Serial No. 166,550, filed June 6, 1950, now abandoned.

The new polymeric materials are copolymers of acrylonitrile with amides, a nitrogen atom of which is directly attached to a radical containing the >C=C< linkage.

The amides which are copolymerized with acrylonitrile to produce the copolymers of this invention have the general formula

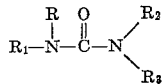

in which R is hydrogen or an alkyl radical containing from 1 to 5 carbon atoms, or an aryl or aralkyl radical having from 6 to 9 carbons, e. g., phenyl, benzyl, ethylphenyl, etc., $R_1$ is allyl or vinyl, and $R_2$ and $R_3$ are hydrogen, alkyl radicals containing from 1 to 5 carbon atoms, or aryl or aralkyl radicals having from 6 to 9 carbons, and may be the same or different.

Specific examples of the amides which are copolymerized with acrylonitrile in accordance with the invention are allyl urea, N-vinyl-N-methyl-N',N'-dimethylurea, N-vinyl-N',N-diethylurea, etc.

The copolymers of the invention may contain in the molecule, from 1 to 99%, preferably from 1 to 50% by weight of the amide and are variously suitable for the production of synthetic fibers, films, and shaped articles generally, as coating compositions, and so on. In a specifically preferred embodiment of the invention, the copolymer comprises at least 80% of acrylonitrile, and at least 1% of the amide. When the copolymer consists of acrylonitrile and an amide which is copolymerizable with acrylonitrile, as disclosed herein, it may advantageously contain from 80 to 99% of acrylonitrile and from 1 to 20% of the amide. However, when the acrylonitrile and amide together total less than 100% of the copolymer, the copolymer may be a ternary copolymer containing, in addition to at least 80% acrylonitrile and at least 1% of the amide, from 1 to 19% of another unsaturated monomer which is copolymerizable with the acrylonitrile and the amide, including acids, such as acrylic, haloacrylic, and methacrylic acids, esters such as methyl methacrylate, butyl methacrylate, octyl methacrylate, methoxymethyl methacrylate, chlorethyl methacrylate, and the corresponding esters of acrylic and alpha-chloracrylic acids; vinyl and vinylidene halides such as vinyl chloride, vinyl fluoride, vinylidene chloride, vinylidene fluoride, 1-fluoro-1-chlorethylene; vinyl carboxylates such as vinyl acetate, vinyl chloracetate, vinyl propionate, and vinyl stearate; N-vinyl lactams such as N-vinyl-caprolactam, N-vinyl-butyrolactam; vinyl aryl compounds such as styrene; vinyl-substituted heterocyclic tertiary amines such as the vinylpyridines and alkyl-substituted vinylpyridines such as 2-vinylpyridine and 5-ethyl-2-vinylpyridine; and other compounds such as methyl vinyl ketone, chlortrifluoroethylene, methylfumarate, methyl vinyl sulfone, methyl vinyl sulfoxide, methyl vinyl sulfide, fumaronitrile, and maleic acid or maleic anhydride.

The new copolymers may be synthesized from mixtures of the monomers by any of the known polymerization procedures including solution polymerization, mass or bulk polymerization, and polymerization in aqueous suspension or emulsion, in the presence of a dispersing or emulsifying agent, the suspension or emulsion being maintained by any agitation method, for example by tumbling in a rotating reactor, or through the use of any suitable rotary stirring device. A wide variety of emulsifying agents may be used. In general, any composition having both hydrophilic and hydrophobic radicals may be used and the expression "emulsifying agent" is intended to include commercial soaps made by the saponification of animal and vegetable oils, such as sodium stearate, potassium laurate, ammonium oleate, and mixtures of these and other salts as they occur in commercially available soaps. Other emulsifying agents are the rosin soaps, the salts of sulfonated hydrocarbons, dialkyl sodium sulfosuccinates, the salts of partial esters of sulfuric acid and high molecular weight alcohols, quaternary ammonium salts such as stearyl dimethyl benzyl ammonium chloride, non-ionic emulsifiers such as ethylene oxide condensates of hexitan monostearates, fatty acids, mercaptans and alcohols, and hexitan monostearates.

The copolymerization reaction may be catalyzed by means of any free-radical-producing catalyst. Suitable catalysts include the water-soluble peroxy compounds for example hydrogen peroxide, sodium peroxide, sodium perborate, sodium persulfate and other alkali metal salts of peroxy acids, or other water-soluble peroxy compounds. Azo catalysts, such as azo-2,2'-diisobutyronitrile may be used advantageously in the copolymerization. A wide variation in concentration of catalyst may be used depending on the temperature of copolymerization, the concentration of monomers in the reaction mass, and the molecular weight desired for the copolymer. From 0.1 to 5% by weight may be used. In general, it is desirable to have a uniform reaction rate and therefore a substantially uniform concentration of the catalyst is desired throughout the reaction. An approximation of these conditions may be obtained by separately preparing an aqueous solution and adding the solution in increments periodically throughout the reaction.

The copolymers of the invention may also be produced by redox polymerization in which the copolymerization is conducted at low temperature in the presence of a peroxy type catalyst and a reducing agent which forms a reduction-oxidation system ("redox" system) with the peroxy compounds which accelerate the copolymerization.

The new copolymers can be produced, also, by a special solution polymerization procedure in which the solvent is saturated with a calculated mixture of the monomers, the catalyst, or a portion thereof is added, and the copolymerization is conducted just at reflux temperature by continuously adding a mixture of the monomers in predetermined proportion to the mass at such a rate as to keep the reflux temperature substantially constant. In this manner, the desired uniform concentration of each monomer is maintained in the reactor and the products are substantially homogeneous with respect to both composition and molecular weight. The catalyst solution may be added continuously at a controlled rate to the solution to maintain the catalyst concentration constant during the reaction.

In another embodiment, the monomers, mixed in predetermined proportion, are dissolved in the solvent, and acrylonitrile is added continuously to the solution.

The copolymerization may be conducted in the presence of molecular weight regulators which act as chain terminators and prevent the formation of very large molecular weight increments. Such regulators are exemplified in the high molecular weight aliphatic mercaptans, such as dodecyl mercaptan and dithioglycidol, and by carbon tetrachloride.

The copolymers are soluble in a wide variety of solvents, depending on the composition of the copolymer. Those copolymers containing at least 80% of acrylonitrile and at least 1% of the amide, including ternary polymers, are soluble in such solvents as N,N-dimethylacetamide, N,N-dimethylformamide, sulfolane, mixtures of nitromethane and water, mixtures of nitromethane and formamide, etc. Such copolymers are particularly adapted to the preparation of valuable, synthetic fibers by extrusion of a solution thereof into an evaporative medium or into a liquid which is a non-solvent for the polymer. Fibers, films and other articles formed from the copolymers of the invention can be dyed to deep, fast shades in a dyebath containing an acid wool type dye and from 1 to 20% of sulfuric acid on the weight of the material to be dyed. The new copolymers which contain the lesser amounts of acrylonitrile are variously useful as coating compositions and for the production of molded articles. Those copolymers containing from 10 to 70% of acrylonitrile and from 30 to 90% of the amide are also useful for blending with a non-dye-receptive polymer containing at least 80% acrylonitrile in the polymer molecule to produce blends which can be dyed in an aqueous bath containing a wool type acid dye and sulfuric acid, and in such blends may be used in a proportion of from 2 to 50% on the weight of the blend.

The evaporative medium used in dry-spinning filaments or yarns from solutions of the new copolymers may comprise any gaseous medium which is inert to the copolymer, such as air, nitrogen, steam, etc., or any mixture of such inert media.

The liquid non-solvent used in wet-spinning or casting the solutions of the new copolymers may be a mixture of water and the spinning solvent, isopropanol, glycerin, a mixture of predominantly aromatic hydrocarbons such as that available commercially under the trade designation Solvesso-100, or any appropriate liquid which is an extractive for the spinning or casting solvent and a non-solvent for the copolymer.

Further details of the practice of the invention are set forth in the following examples in which the parts are by weight.

*Example I*

To 700 parts of water there were added 24.1 parts of N-vinyl-N-methyl-N',N'-dimethylurea and 56.5 parts of acrylonitrile. The solution was heated to reflux and a solution of 3.0 parts of potassium persulfate in 50 parts of water was added after which 80 parts of acrylonitrile were added continuously over 26 minutes at a rate controlled to maintain the reflux temperature substantially constant. The mass was heated at 75° C. for an additional 15 minutes and the copolymer was then filtered, washed, and dried. The copolymer contained about 94% of acrylonitrile and about 6% of N-vinyl, N-methyl-N',N'-dimethylurea.

Films were formed from a dimethylacetamide solution of the copolymer by conventional casting procedures, and dyed in a dyebath prepared by dissolving 15% of sulfuric acid (96%) and 2% of the acid wool dye Wool Fast Scarlet G Supra (percentages on the weight of film being dyed), in water. The film was entered into the bath at 55° C., the bath was brought to the boil in 10 minutes, and boiled for 60 minutes. The copolymer films were dyed to an acceptable red shade under these conditions.

*Example II*

Acrylonitrile and allyl urea were copolymerized as in Example I, to produce a copolymer containing about 90% of acrylonitrile and about 10% of allyl urea. Films formed from the copolymer were dyed to an acceptable red shade as in Example I.

The invention is defined by the appended claims.

I claim:

1. A copolymer containing, by weight in the polymer molecule, at least 80% of acrylonitrile and at least 1% of N-vinyl-N-methyl-N',N'-dimethylurea.

2. A process for preparing a copolymer which comprises heating a mixture, comprising acrylonitrile and N-vinyl-N-methyl-N',N'-dimethylurea, in the presence of a polymerization catalyst for the mixture.

References Cited in the file of this patent

UNITED STATES PATENTS

| Number | Name | Date |
|---|---|---|
| 2,544,638 | Caldwell | Mar. 3, 1951 |